M. M. BILLINGSLEY.
DOUGH RAISER.
APPLICATION FILED NOV. 22, 1911.
1,045,364.
Patented Nov. 26, 1912.
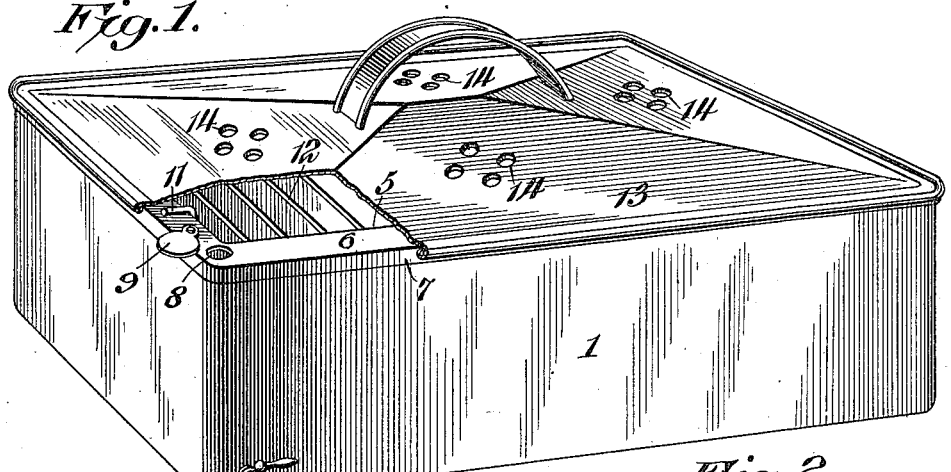
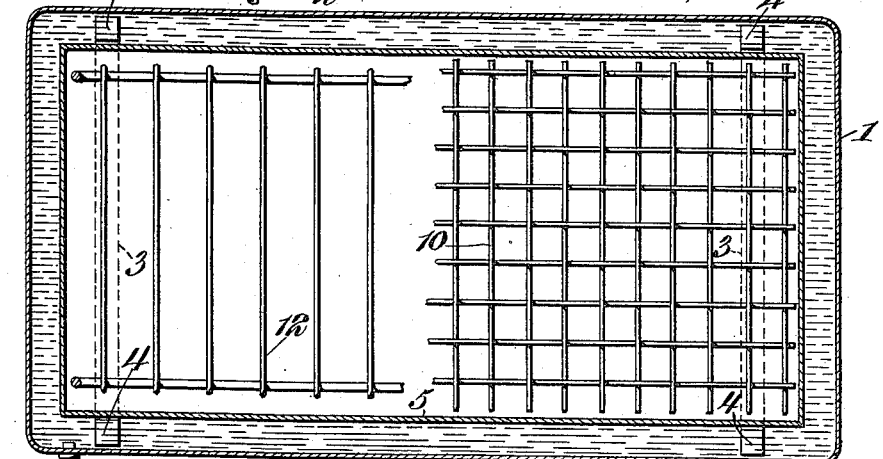
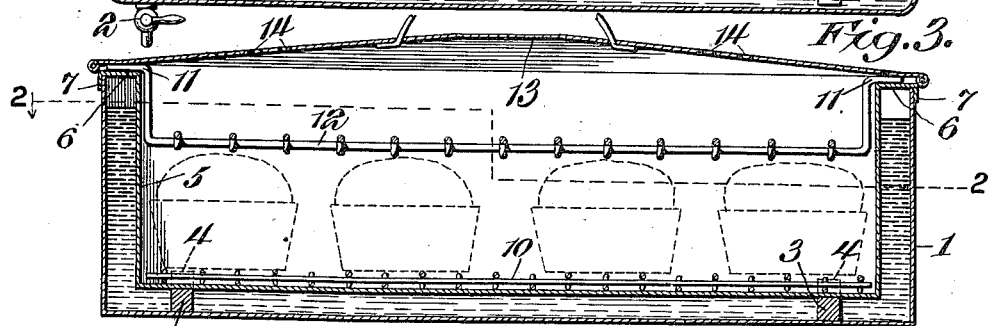
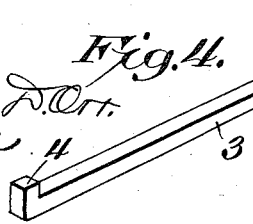
Witnesses
Howard D. Ort.
Greist
Inventor,
M. M. Billingsley,
By E. G. Siggers
Attorney

UNITED STATES PATENT OFFICE.

MAUD M. BILLINGSLEY, OF BEAVER FALLS, PENNSYLVANIA.

DOUGH-RAISER.

1,045,364.   Specification of Letters Patent.   Patented Nov. 26, 1912.

Application filed November 22, 1911. Serial No. 661,739.

*To all whom it may concern:*

Be it known that I, MAUD M. BILLINGSLEY, a citizen of the United States, residing at Beaver Falls, in the county of Beaver and State of Pennsylvania, have invented a new and useful Dough-Raiser, of which the following is a specification.

This invention relates to dough raisers, and has for its object the provision of a device, which is adapted to maintain dough in preparatory stages of bread and cake making at an equable temperature, and one calculated to facilitate the fermentation process and the resultant expansion or rising of the same.

A further object is to effect this result in such manner as to preclude the exposure of the dough to dust laden air and contamination from other causes.

Having these objects in view, the invention resides in the particular arrangement and construction and combination of parts hereinafter particularly claimed and which will now be described in detail in connection with the accompanying drawing, wherein is shown a preferred embodiment of the invention.

In the drawing:—Figure 1 illustrates the device in perspective with a portion of the cover broken away. Fig. 2 is a horizontal section on the line 2—2 of Fig. 3. Fig. 3 is a vertical longitudinal section. Fig. 4 is a detail perspective of one of the spacing bridges.

The device as illustrated consists essentially of an outer vessel 1, provided in its lower portion with a spigot 2. Within this outer vessel transversely arranged spacing bridges 3 are disposed, each consisting of a bar having a length substantially equal to the inner width of the vessel 1 and upturned at the ends to form studs 4. Within the outer vessel an inner vessel 5 is arranged resting upon the spacing bridges 3 and confined laterally between the studs 4. This inner vessel is of substantially the same shape as the outer vessel, but is of less depth and also of less width and length so that when disposed within the outer vessel upon the bridges 3, the upper edges of the two vessels will be in substantially the same horizontal plane and the side and end walls will be spaced apart a distance corresponding approximately to the space between the bottom walls due to the interposed spacing bridges. The inner vessel is provided preferably with a marginal outwardly extending flange 6, which bridges the interspace between the side and end walls, and is downwardly flanged at 7 to embrace said walls on the exterior. This flange is provided with a filling opening 8 for the interspace, said opening being normally closed by a pivotally mounted cap 9. Upon the bottom of the inner vessel is disposed a wire mat 10, formed of coarsely woven wire and suspended within the upper portion of the inner vessel by the hooks 11 is a tray 12 of wire. A cover 13 having an upwardly tapering central portion is provided with vents 14 and is of a size to extend to the outer edge of the flange 6 in embracing relation to the flange 7 so as to wholly cover both vessels and the hooks 11.

The device is advantageously used as follows: The flour is first placed within the inner vessel and the interspace between the walls filled with a heating fluid, such as hot water, the cover being placed in position, when the chill is taken off the flour and it is brought into a favorable condition to receive the leavening material. After the sponge is made up it is placed in a suitable pan within the inner receptacle and the cover being replaced allowed to stand and rise. When the proper stage has been reached, it is again removed and kneaded into loaves and having been placed in the bake pans is again placed in the inner receptacle upon the mat, which serves to space the pans from the heated bottom and permit a circulation of air beneath the same. When ready for baking, the loaves are removed and transferred to the oven. During the several steps of the process, it will be observed that the dough is entirely inclosed and shielded from dust and from cold drafts of air, while the body of hot water surrounding the inner vessel maintains the same at an equable temperature. The provision of the draw-off spigot 2 and the filling opening 8 enables the water to be drawn off and replaced in whole or in part at any time without disturbing the inner vessel or its contents, so that during a long period of time the water may be changed to maintain a proper temperature. The tray arranged in the upper part of the vessel enables the inner vessel to be employed at the same time for the raising of the dough in its lower portion and for the raising of additional quantities of the same or a different kind of dough in the upper portion of the vessel. When not in use the two vessels are easily separated permitting their drying and cleaning, and the wire mat and tray are readily removed from the inner vessel for cleansing purposes. The component parts are of simple construction and the device as a whole is exceedingly efficient for the purposes intended, it being also adapted for use as a receptacle for the newly baked bread to maintain the same or other cookery products in a warm condition.

What is claimed is:—

In a dough raiser, an outer vessel, an inner vessel of smaller dimensions in readily separable relation to the outer vessel and having an upper marginal outturned flange terminating in a depending flange adapted to surround the upper marginal portions of the walls of the outer vessel with the outstanding flange resting on the upper edges of the walls of the outer vessel to thereby space the inner vessel from the outer vessel to provide an interspace between the side walls and bottom walls of the two vessels for hot water, and a cover having a margin adapted to embrace the depending flange and rising therefrom toward the center of the cover in spaced relation to the outstanding flange of the inner vessel, the dough raiser being also provided with a wire tray provided with suspension hooks adapted to engage over the outstanding flange of the inner vessel between the same and the corresponding portion of the cover.

In testimony, that I claim the foregoing as my own, I have hereto affixed my signature in the presence of two witnesses.

MAUD M. BILLINGSLEY.

Witnesses:
 WILLIAM McKIM,
 ALEX. McKIM.

---

Copies of this patent may be obtained for five cents each, by addressing the "Commissioner of Patents, Washington, D. C."